US012600269B2

(12) United States Patent (10) Patent No.: US 12,600,269 B2

Hintermaier (45) Date of Patent: Apr. 14, 2026

(54) VEHICLE AND METHOD FOR ADJUSTING A POSITION OF A DISPLAY IN THE VEHICLE

(71) Applicant: Bayerische Motoren Werke Aktiengesellschaft, Munich (DE)

(72) Inventor: Wolfgang Hintermaier, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 111 days.

(21) Appl. No.: 17/926,259

(22) PCT Filed: Apr. 28, 2021

(86) PCT No.: PCT/EP2021/061114

§ 371 (c)(1),
(2) Date: Nov. 18, 2022

(87) PCT Pub. No.: WO2021/233654

PCT Pub. Date: Nov. 25, 2021

(65) Prior Publication Data

US 2023/0202298 A1 Jun. 29, 2023

(30) Foreign Application Priority Data

May 20, 2020 (DE) ..................... 10 2020 113 692.7

(51) Int. Cl.
B60N 2/20 (2006.01)
B60K 35/10 (2024.01)
(Continued)

(52) U.S. Cl.
CPC ............... B60N 2/20 (2013.01); B60K 35/10 (2024.01); B60K 35/53 (2024.01); B60K 35/60 (2024.01);
(Continued)

(58) Field of Classification Search
CPC ........ B60K 35/00; B60K 35/10; B60K 35/22; B60K 35/3553; B60K 35/60;
(Continued)

(56) References Cited

U.S. PATENT DOCUMENTS

| | | | |
|---|---|---|---|
| 2010/0045088 A1* | 2/2010 | Kunou | B60R 11/0235 |
| | | | 297/354.1 |
| 2015/0138043 A1* | 5/2015 | Rawlinson | G06F 3/1454 |
| | | | 345/2.2 |

(Continued)

FOREIGN PATENT DOCUMENTS

| | | | | |
|---|---|---|---|---|
| CN | 110626286 A | 12/2019 | | |
| DE | 102015013081 A1 * | 4/2016 | ............. | B60K 35/00 |

(Continued)

OTHER PUBLICATIONS

English Machine Translation of CN110626286B, Accessed Aug. 2, 2024.*

(Continued)

*Primary Examiner* — Jason Holloway
*Assistant Examiner* — Blake A Wood
(74) *Attorney, Agent, or Firm* — Crowell & Moring LLP

(57) ABSTRACT

A vehicle and a method are provided for adjusting a position of a display in the vehicle. The vehicle includes a seat, a display, particularly a touch display, a drive and an evaluation unit. The seat is disposed in the passenger compartment of the vehicle and has a base and a backrest, which can be inclined relative to the base and can be transferred at least between a first angle of inclination and a second angle of inclination with respect to the base. The drive is designed to transfer the display between a first position and a second position. The display is disposed in the passenger compartment remote from the backrest. The evaluation unit is designed to determine an angle of inclination of the backrest (Continued)

and to control the drive in order to transfer the display to the first position if the angle of inclination of the backrest corresponds to the first angle of inclination and to transfer the display to the second position if the angle of inclination of the backrest corresponds to the second angle of inclination.

12 Claims, 2 Drawing Sheets

(51) Int. Cl.
  *B60K 35/22*      (2024.01)
  *B60K 35/53*      (2024.01)
  *B60K 35/60*      (2024.01)
  *B60K 35/65*      (2024.01)

(52) U.S. Cl.
  CPC ............ *B60K 35/22* (2024.01); *B60K 35/654* (2024.01); *B60K 35/658* (2024.01); *B60K 2360/1438* (2024.01); *B60K 2360/774* (2024.01)

(58) Field of Classification Search
  CPC ................ B60K 35/654; B60K 35/658; B60K 2360/1438; B60K 2360/1523; B60K 2360/685; B60K 2360/774; B60N 2/0272; B60N 2/20; B60N 2/22
  See application file for complete search history.

(56) References Cited

U.S. PATENT DOCUMENTS

| | | | | |
|---|---|---|---|---|
| 2017/0101032 A1* | 4/2017 | Sugioka | .............. | B60N 2/0881 |
| 2017/0349069 A1 | 12/2017 | Helot | | |
| 2019/0111758 A1* | 4/2019 | Shaikh | .............. | B60H 1/00392 |
| 2019/0340997 A1 | 11/2019 | Birman et al. | | |

FOREIGN PATENT DOCUMENTS

| | | |
|---|---|---|
| DE | 10 2014 019 125 A1 | 6/2016 |
| DE | 10 2017 211 508 A1 | 1/2019 |

OTHER PUBLICATIONS

English Machine Translation of DE102015013081A1, Accesses Apr. 29, 2025.*
International Search Report (PCT/ISA/210) issued in PCT Application No. PCT/EP2021/061114 dated Jul. 13, 2021 with English translation (five (5) pages).
German-language Written Opinion (PCT/ISA/237) issued in PCT Application No. PCT/EP2021/061114 dated Jul. 13, 2021 (five (3) pages).
German-language Search Report issued in German Application No. 10 2020 113 692.7 dated Apr. 14, 2021 with partial English translation (12 pages).
English translation of Chinese-language Office Action issued in Chinese Application No. 202180034230.8 dated Sep. 26, 2025 (8 pages).

* cited by examiner

VEHICLE AND METHOD FOR ADJUSTING A POSITION OF A DISPLAY IN THE VEHICLE

BACKGROUND AND SUMMARY

The invention relates to a vehicle and to a method for adjusting a position of a display, in particular a touch display, in the vehicle.

Vehicles are known from the prior art which have one or more displays, and in particular touch displays, in the passenger compartment of the vehicles to operate functions of the vehicle and/or to display items of information to a user in the vehicle.

Furthermore, adjustable vehicle seats are known which permit, among other things, manual and/or electrical adjustment of the angle of inclination of their backrest. In particular if greater angles of inclination of the backrests are used (for example in a resting or sleeping position), visibility or operability of conventional displays or touch displays can be restricted.

DE102017211508A1 describes an operating element and, in particular, a touchscreen for seats in the vehicle backseat and a vehicle having this operability, wherein vehicle-related functions are operable by means of the operating unit. In one proposed embodiment, the touchscreen is arranged in an interior panel of a door of the vehicle. Furthermore, the touchscreen can be designed to be movable and/or detachable from the door panel.

It is an object of the present invention to provide a vehicle and a method for adjusting a position of a display, in particular a touchscreen display in the vehicle, wherein the position of the display is adjusted in particular in dependence on an inclination of a backrest of a seat of the vehicle.

The object identified above is achieved by the features of the independent claims. The dependent claims have preferred refinements of the invention as the content.

According to a first aspect of the present invention, a vehicle is proposed which comprises a seat, a display, in particular a touch display, a drive device, and an evaluation unit. The vehicle can be, for example, a road vehicle (e.g., motorcycle, passenger vehicle, van, truck) or a rail vehicle. The drive device advantageously comprises an electromechanical drive such as a motor, a linear motor, or drive types deviating therefrom. The evaluation unit can be designed, for example, as an ASIC, FPGA, processor, digital signal processor, microcontroller, or the like. The seat is arranged in the passenger compartment of the vehicle and comprises a base, which is generally fastened on a vehicle bottom, and a backrest that can be inclined relative to the base and is transferable at least between a first angle of inclination and a second angle of inclination with respect to the base. An adjustment of the angle of inclination of the backrest can be carried out manually and/or automatically. The drive device is configured to transfer the display between a first position and a second position, wherein the display is arranged away from the backrest in the passenger compartment of the vehicle. Finally, the evaluation unit is configured to ascertain an angle of inclination of the backrest and to actuate the drive device in order to transfer the display into the first position when the angle of inclination of the backrest corresponds to the first angle of inclination and in order to transfer the display into the second position when the angle of inclination of the backrest corresponds to the second angle of inclination. The first angle of inclination and the second angle of inclination can in principle represent arbitrarily settable angles of inclination of the backrest; however, one particularly advantageous application of the above-mentioned components according to the invention is achievable in particular if the first angle of inclination and the second angle of inclination differ from one another particularly strongly.

For example, the first angle of inclination of the backrest corresponds to an essentially upright seated position of a user of the seat, which is assumed, for example, by a driver of the vehicle during a normal driving mode. In contrast, the second angle of inclination of the backrest corresponds, for example, to a resting and/or recumbent position of the user of the seat, in which the body of the user essentially assumes a horizontal position. The advantageous effect is achieved by the automatic adjustment of the position of the display to a respective angle of inclination of the backrest that the display is usable independently of a respective angle of inclination by a user of the seat. In particular in the case of a particularly preferred use of a touch display, it is possible in this way to achieve optimum ability to reach and thus operate the touch display independently of a respective angle of inclination of the backrest.

It is to be generally noted that the seat can in principle be an arbitrary seat of the vehicle (for example, a driver seat, a front passenger seat, one or more rear seats), and that the display according to the invention, the drive device according to the invention, and the evaluation unit according to the invention can be arranged at an arbitrary number of seats of the vehicle. In other words, it is possible to install the drive device according to the invention and the evaluation unit according to the invention multiple times in the vehicle, so that, for example, a respective display can be assigned to each occupant. In this context it is also contemplated to arrange one or more displays in such a way that they are operable simultaneously, for example, from two adjacent seats (for example between a driver seat and a front passenger seat). In addition, it is contemplated that a separate drive device and a separate evaluation unit are assigned to each display, or that one drive device and/or one evaluation unit are each used for a plurality of displays in the transportation means. A use of a common drive device for two or more displays, for example, is reasonable in particular if the displays are arranged in direct proximity (for example adjacent to one another between the driver seat and the front passenger seat). The respective displays are advantageously moreover arranged in the vehicle so that they can be reached in an ergonomically favorable manner for the respective occupant.

The evaluation unit is preferably configured to ascertain the second position of the display on the basis of predefined values for a position and an alignment of the display and/or an ability to reach the display by a user of the seat and/or a viewing angle of a user on the display and/or a user identification and/or a light incidence on the display and/or a user input. The predefined values for a position and alignment of the display are stored, for example, in a storage unit connected with respect to information technology to the evaluation unit and are readable therefrom. The ascertainment of the ability to reach the display by the user and/or the ascertainment of the viewing angle of the user on the display preferably take place using an interior camera arranged in the passenger compartment, on the basis of which a respective size and a respective viewing angle of a user are ascertainable. Alternatively or additionally, it is contemplated to determine average values ascertained beforehand for an ability to reach the display in dependence on the angle of inclination and a viewing angle on the display in dependence on the angle of inclination on the basis of a plurality of users. These average values are subsequently storable and usable as the above-mentioned predefined values for a position and alignment of the display. Alternatively or additionally, a use of user-specific values for a position and an alignment of the display is possible, which can be selected and applied automatically in conjunction with a user identification (for example on the basis of the interior camera, a received identifier of a mobile terminal of respective users, etc.). In that a light incidence on the display is additionally ascertained (for example also on the basis of the interior camera and/or on the basis of a light sensor in the region of the display, etc.), it is possible to always align the display in such a way that from the viewpoint of the user, as few reflections as possible are generated on a usage side of the display. Alternatively or additionally, it is possible to adjust a respective position of the display in response to a user input (for example by means of a touch operation of the display itself and/or by means of an operating element of the vehicle deviating therefrom).

The evaluation unit is preferably configured to transfer the display by way of the drive device in accordance with a predefined mapping rule into the first position, into the second position, or into an intermediate position between the first position and the second position, wherein the mapping rule maps a respective angle of inclination of the backrest on a respective position of the display. In the simplest case, this mapping rule corresponds to a linear mapping between respective angles of inclination of the backrest and respective positions of the display. In addition, it is contemplated to use mapping rules deviating therefrom, which are ascertained, for example, on the basis of optimum ability to reach the display with respect to respective angles of inclination of the backrest.

Furthermore, the drive device is preferably configured to transfer the display by means of shifting and/or pivoting and/or rotating into the second position. By means of a shifting process, the display may be shifted, for example, from a storage region behind a surface of the passenger compartment of the vehicle into a predefined angle in the region of the passenger compartment. In principle, arbitrary combinations of above-mentioned movement options are also reasonably usable. It is thus contemplated, for example, to first push the display essentially into a vertical alignment out of the storage region in case of a transfer into the second position and subsequently to adjust it by means of rotating and/or pivoting optimally to a respective seated position of a user.

In a further advantageous embodiment, the display is lowered into an opening of a surface of the passenger compartment in the first position. In conjunction with a use of a pivoting process to change the position of the display, it is therefore possible that the display is located in such a lowered state having a usage side of the display (a display side and/or an operating side of the display) downward (i.e., not accessible from the region of the passenger compartment) or upward (i.e., accessible from the region of the passenger compartment). In the case of an arrangement of the display in the first position accessible from the region of the passenger compartment, it is therefore permanently usable independently of a respective angle of inclination of the backrest. In the case of an arrangement of the display in the first position inaccessible from the region of the passenger compartment, in contrast, it is protected from inadvertent touches and/or damage. In the latter case, it is additionally contemplated that the display has a cushion on the rear side, so that in the stowed state it is additionally usable as an ergonomic armrest.

The vehicle preferably additionally comprises a cover, wherein the cover is configured to close the opening of the surface of the passenger compartment in the first position of the display. The cover is manually and/or automatically removable when the display is brought into a position deviating from the first position. Vice versa, the cover is manually and/or automatically closable when the display has been returned into the first position. The cover is particularly advantageously usable when the display has been lowered in the first position by means of an above-described shifting process into a storage space, without being restricted to such a variant.

Furthermore, the evaluation unit is configured to receive user inputs on the display and to output control commands for actuating functions of the vehicle to the vehicle on the basis of the received user inputs. For example, climate control, entertainment, telephony, vehicle setting, navigation, seat setting, and further functions come into consideration as such functions.

The evaluation unit is particularly preferably configured to select and/or display respective functions of the vehicle operable by the display in dependence on the angle of inclination of the backrest. It is possible in this case, for example, to select and/or display the respective functions of the vehicle in dependence on a respective ability to reach operating elements (which do not correspond to the display or the touch display) for operating these functions. This can be advantageously used in particular if, for example, a central display for operating entertainment functions is no longer reachable in the second angle of inclination of the backrest (thus in a resting and/or recumbent position).

One advantageous arrangement of the display of the vehicle is located in a center console and/or in an armrest of a door and/or the seat and/or in a door panel and/or in a storage surface of the vehicle. In addition, fundamentally arbitrary further arrangement positions are contemplated for the display in the vehicle.

The display is advantageously additionally configured to be moved manually between the first position and the second position and/or to be moved manually into a use position and/or to be manually stowed.

According to a second aspect of the present invention, a method is proposed for adjusting a position of a display in a vehicle. In a first step of the method according to the invention, an angle of inclination of a backrest of a seat of the vehicle is ascertained by means of an evaluation unit according to the invention. By means of the evaluation unit according to the invention, in a second step of the method according to the invention, a drive device of the display, in particular a touch display, is actuated to transfer the display into a first position if the inclination of the backrest corresponds to a first angle of inclination and to transfer the display into a second position if the inclination of the backrest corresponds to a second angle of inclination, wherein the seat is arranged in the passenger compartment of the vehicle and comprises a base and a backrest movable relative to the base, which is transferable at least between the first angle of inclination and the second angle of inclination with respect to the base, wherein the display is transferable by means of the drive device between the first position and the second position and wherein the display is arranged away from the backrest in the passenger compartment.

Further details, features, and advantages of the invention result from the following description and the figures.

DETAILED DESCRIPTION OF THE DRAWINGS

Figure 1:
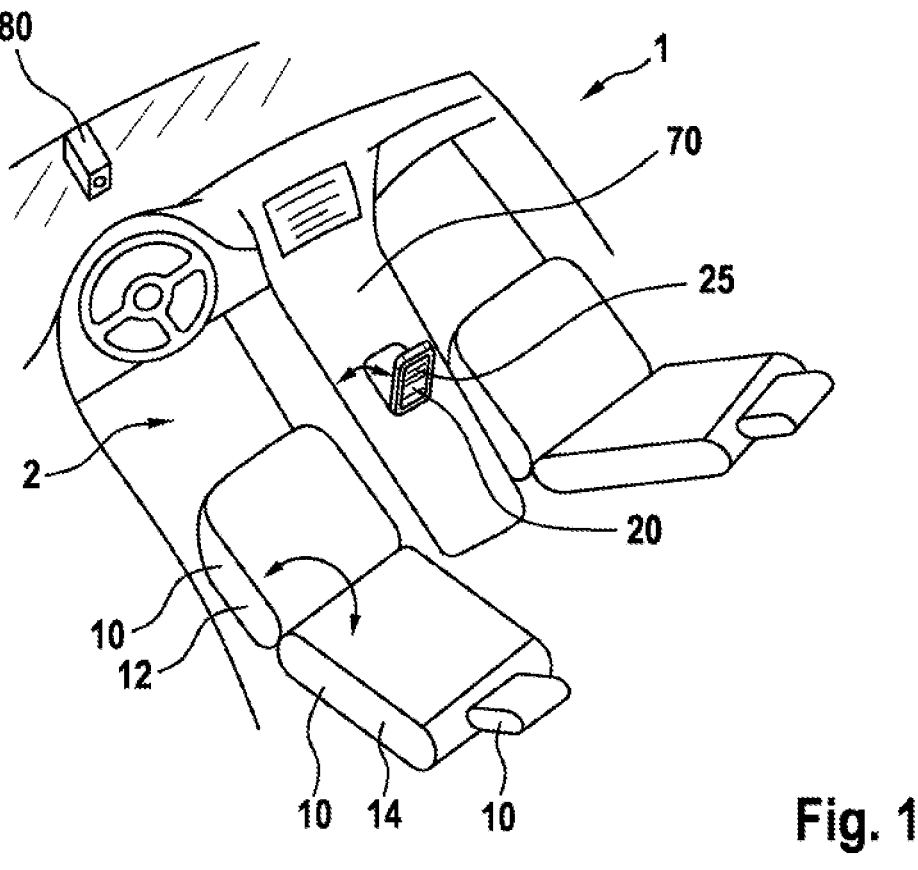
FIG. 1 is a schematic overview of components of a vehicle according to the invention in a first embodiment.

FIG. 1 shows a schematic overview of components of a vehicle 1 according to the invention in a first embodiment. The vehicle 1 comprises a vehicle seat 10, which has a base 12 and a backrest 14 that can be inclined with respect to the base 12. In a center console 70 of the vehicle 1, a touch display 20 is arranged, which is automatically pivoted by means of an evaluation unit (not shown) and a drive device (not shown) in dependence on a respective angle of inclination of the vehicle seat 10, so that a usage side 25 of the touch display 20 is always aligned optimally with respect to a user (not shown) of the vehicle seat 10. A respective angle of inclination of the backrest 14 and a respective ability to reach the touch display 20 by the user is ascertained by the evaluation unit on the basis of images of an interior camera 80, which is arranged in the passenger compartment 2 of the vehicle 1 and is oriented in the direction of the user of the driver seat 10.

Figure 2:
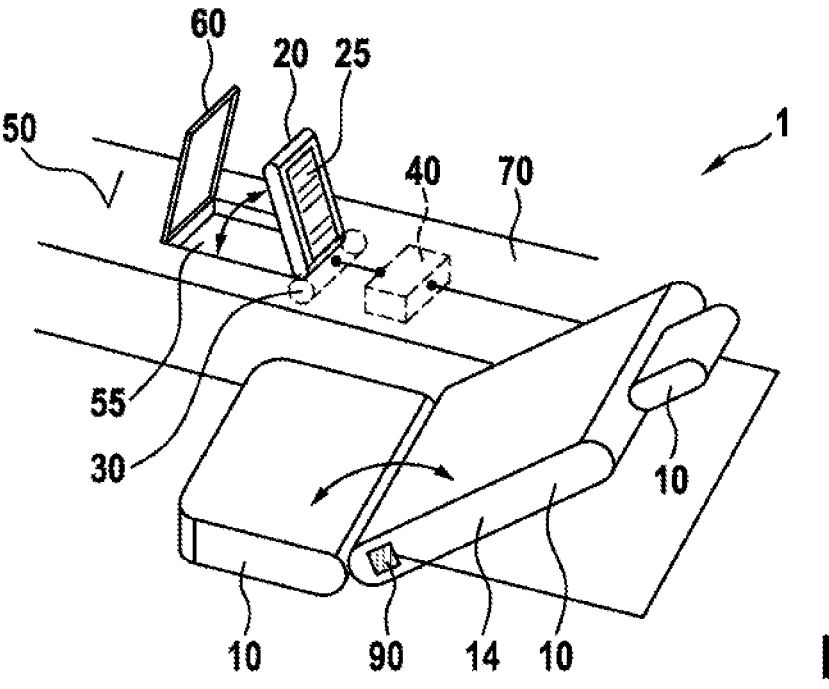
FIG. 2 is a schematic partial view of a vehicle according to the invention in a second embodiment.

FIG. 2 shows a schematic partial view of a vehicle 1 according to the invention in a second embodiment. In this embodiment, an opening 55 of a surface 50 of a center console 70 of the vehicle 1, in which a touch display 20 can be lowered, is equipped with a cover 60. In this way, it is possible to cover the touch display 20 in a lowered (i.e., unused) state by means of the cover 60, so that it is protected from inadvertent touches and/or damage. In addition, a drive device 30 for the touch display 20 is shown in FIG. 2, which is connected with respect to information technology to an evaluation unit 40, which is designed here as a microcontroller. Furthermore, the evaluation unit 40 is connected with respect to information technology to an inclination sensor 90 of a backrest 14 of a seat 10, so that the evaluation unit 40 is made capable of adjusting a position of the touch display 20 in dependence on a respective angle of inclination of the backrest 14, so that a usage side 25 of the touch display 20 is always oriented optimally in the direction of a user (not shown) of the seat 10.

Figure 3:
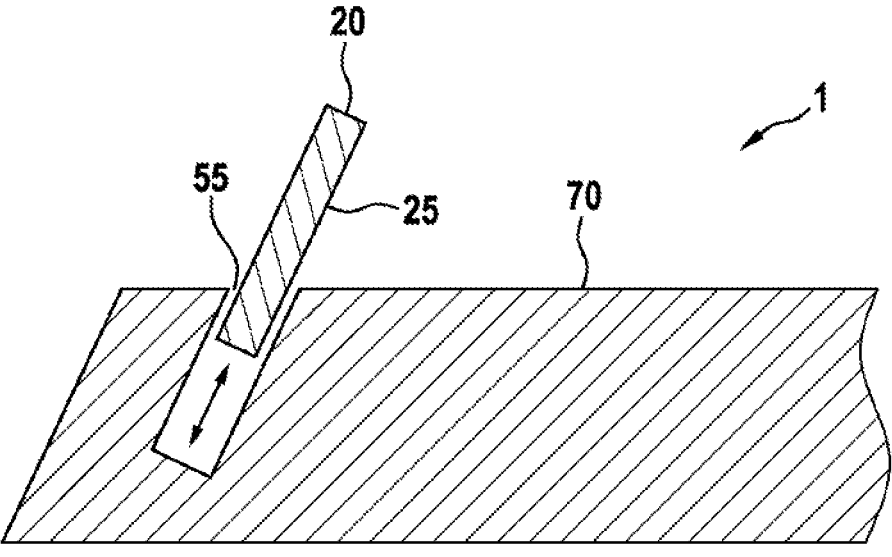
FIG. 3 is a schematic partial cross-sectional view of a vehicle according to the invention in a third embodiment.

FIG. 3 shows a schematic partial cross-sectional view of a vehicle 1 according to the invention in a third embodiment. In this embodiment, a display 20 is arranged so it is displaceable by means of a drive device (not shown) in the direction of the arrow in a center console 70 of the vehicle 1. To reach a second position of the display 20, the display 20 is pushed out of an opening 55 in the center console 70, so that a usage side 25 of the display 20 can be made available to a user (not shown) in a recumbent position.

Figure 4:
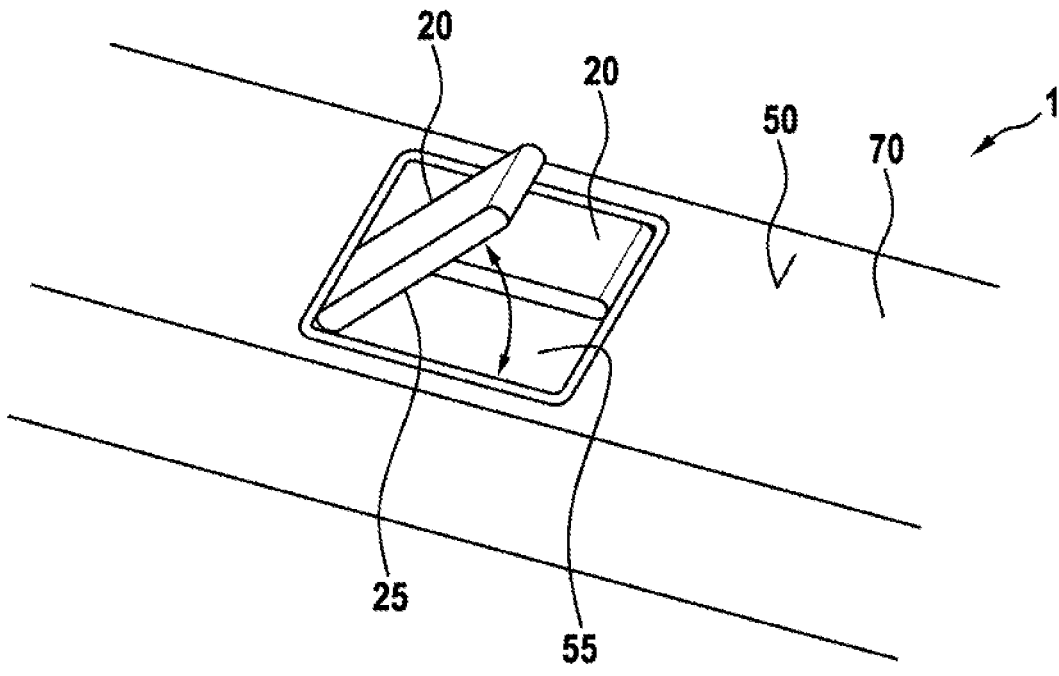
FIG. 4 is a schematic partial view of a vehicle according to the invention in a fourth embodiment.

FIG. 4 shows a schematic partial view of a vehicle 1 according to the invention in a fourth embodiment. In this embodiment, two touch displays 20 are arranged adjacent to one another in a center console 70 of the vehicle 1 and are configured to be pivoted independently of one another in dependence on a respective angle of inclination of respective corresponding seats (not shown) of the vehicle 1. In a first position, the two touch displays 20 can be lowered into an opening 55 of the center console 70 in such a way that the usage side thereof 25 faces downward and they are therefore protected from inadvertent touches and/or damage.

LIST OF REFERENCE NUMERALS

1 vehicle
2 passenger compartment
10 seat
12 base
14 backrest
20 display
25 usage side
30 drive device
40 evaluation unit
50 surface
55 opening
60 cover
70 center console
80 camera
90 inclination sensor

The invention claimed is:

1. A vehicle, comprising:
a seat;
a display;
a drive; and
an evaluation unit, wherein
the seat is arranged in a passenger compartment of the vehicle and comprises a base and a backrest which is inclinable relative to the base and is transferable between a first angle of inclination and a second angle of inclination with respect to the base,
the drive is configured to transfer the display between a first position and a second position,
the display is arranged away from the backrest in the passenger compartment, and
the evaluation unit is configured to:
ascertain an angle of inclination of the backrest, an ability to reach the display by a user of the seat, and a viewing angle of the user with respect to the display, based on images acquired by an interior camera arranged in the passenger compartment of the vehicle,
ascertain the second position of the display based on the ability to reach the display by the user of the seat and the viewing angle of the user with respect to the display, and
actuate the drive in order to transfer the display into the first position when the angle of inclination of the backrest corresponds to the first angle of inclination, and in order to transfer the display into the second position when the angle of inclination of the backrest corresponds to the second angle of inclination.

2. The vehicle according to claim 1, wherein the display is a touch display.

3. The vehicle according to claim 1, wherein the evaluation unit is configured to ascertain the second position of the display based additionally on one or more of:
a user identification,
a light incidence on the display,
a user input, and
predefined values for a position and alignment of the display.

4. The vehicle according to claim 1, wherein the evaluation unit is configured to transfer the display by way of the drive in accordance with a predefined mapping rule into the first position, into the second position, or into an intermediate position between the first position and the second position, and the mapping rule maps a respective angle of inclination of the backrest on a respective position of the display.

5. The vehicle according to claim 1, wherein the drive is configured to transfer the display by way of:

shifting, pivoting, and/or rotating, into the second position.

6. The vehicle according to claim 1, wherein the display is lowered in the first position into an opening of a surface of the passenger compartment.

7. The vehicle according to claim 6, further comprising:

a cover, wherein the cover is configured to close the opening of the surface of the passenger compartment in the first position of the display.

8. The vehicle according to claim 1, wherein the evaluation unit is further configured to:

receive user inputs on the display, and output control commands for actuating functions of the vehicle to the vehicle on the basis of the received user inputs.

9. The vehicle according to claim 8, wherein the evaluation unit is configured to select and/or display respective functions of the vehicle operable by the display in dependence on the angle of inclination of the backrest.

10. The vehicle according to claim 1, wherein the display is arranged in:

a center console, an armrest of a door and/or the seat, a door panel, or a storage surface, of the vehicle.

11. The vehicle according to claim 1, wherein the display is configured to:

be moved manually between the first position and the second position, be moved manually into a usage position, and/or be manually stowed.

12. A method for adjusting a position of a display in a vehicle, the method comprising:

ascertaining an angle of inclination of a backrest of a seat of the vehicle, an ability to reach the display by a user of the seat, and a viewing angle of the user with respect to the display, based on images acquired by an interior camera arranged in the passenger compartment of the vehicle, ascertaining a second position of the display based on the ability to reach the display by the user of the seat and the viewing angle of the user with respect to the display, and actuating a drive of the display in order to transfer the display into a first position when the inclination of the backrest corresponds to a first angle of inclination and in order to transfer the display into the second position when the inclination of the backrest corresponds to a second angle of inclination, wherein the seat is arranged in a passenger compartment of the vehicle and comprises a base and the backrest, wherein the backrest is inclinable relative to the base and is transferable at least between the first angle of inclination and the second angle of inclination with respect to the base, the display is transferable via the drive between the first position and the second position, and the display is arranged away from the backrest in the passenger compartment.

* * * * *